(12) United States Patent
Rhim et al.

(10) Patent No.: US 7,783,975 B2
(45) Date of Patent: Aug. 24, 2010

(54) CONTENT DISPLAY SYSTEM FOR SHARING CONTENT BETWEEN DISPLAY APPARATUSES

(75) Inventors: Eun-hee Rhim, Suwon-si (KR); Kwang-yun Na, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1409 days.

(21) Appl. No.: 11/203,160

(22) Filed: Aug. 15, 2005

(65) Prior Publication Data

US 2006/0036671 A1 Feb. 16, 2006

(30) Foreign Application Priority Data

Aug. 14, 2004 (KR) .............. 10-2004-0064102

(51) Int. Cl.
*G06F 17/00* (2006.01)
(52) U.S. Cl. ...................................... 715/273
(58) Field of Classification Search .................. 715/273, 715/864
See application file for complete search history.

(56) References Cited

U.S. PATENT DOCUMENTS

| 6,098,086 | A * | 8/2000 | Krueger et al. | 715/263 |
|---|---|---|---|---|
| 6,182,116 | B1 * | 1/2001 | Namma et al. | 709/204 |
| 6,249,291 | B1 * | 6/2001 | Popp et al. | 345/473 |
| 6,263,322 | B1 * | 7/2001 | Kirkevold et al. | 705/400 |
| 6,347,120 | B1 * | 2/2002 | Sakoda | 375/259 |
| 6,898,799 | B1 * | 5/2005 | Jarman | 725/25 |
| 7,000,107 | B2 * | 2/2006 | Hewett et al. | 713/164 |
| 7,081,882 | B2 * | 7/2006 | Sowden et al. | 345/156 |
| 7,467,231 | B2 * | 12/2008 | Kegoya et al. | 709/246 |
| 7,634,731 | B2 * | 12/2009 | Lee | 715/706 |
| 2001/0005890 | A1 * | 6/2001 | Nitaki | 713/202 |
| 2001/0007998 | A1 * | 7/2001 | Yoshiasa | 709/246 |

(Continued)

FOREIGN PATENT DOCUMENTS

JP 2000-231369 A 8/2000

(Continued)

OTHER PUBLICATIONS

Dilley et al., Globally Distributed Content Delivery, IEEE 2002, pp. 50-58.*

(Continued)

*Primary Examiner*—Cong-Lac Huynh
(74) *Attorney, Agent, or Firm*—Sughrue Mion, PLLC

(57) ABSTRACT

A content display system for sharing contents between display apparatuses is provided. The content display system for displaying content, includes a first local interface module connected to a storage device storing the content, a first device interface module receiving a message requesting for the content stored in the storage device, a first display apparatus including a first device agent module extracting the requested content from the storage device through the first local interface module and transmitting the extracted content through the first device interface module, a second device agent module generating the message, a second device interface module transmitting the generated message to the first display apparatus and receiving the extracted content, a content processing module converting the received content into content having an output format suitable for display, and a second display apparatus including a display module outputting the converted content.

25 Claims, 9 Drawing Sheets

U.S. PATENT DOCUMENTS

| | | | |
|---|---|---|---|
| 2002/0057335 A1* | 5/2002 | Tsukada et al. | 348/14.01 |
| 2003/0051025 A1* | 3/2003 | Kwon | 709/223 |
| 2003/0177440 A1* | 9/2003 | Kegoya et al. | 715/500 |
| 2003/0224763 A1* | 12/2003 | Kuramatsu | 455/412.2 |
| 2004/0198396 A1* | 10/2004 | Fransioli | 455/456.3 |
| 2004/0214556 A1* | 10/2004 | Yamada | 455/414.3 |
| 2006/0035629 A1* | 2/2006 | Kodama et al. | 455/415 |
| 2006/0036672 A1* | 2/2006 | Cha et al. | 709/202 |
| 2006/0036678 A1* | 2/2006 | Rhim et al. | 709/203 |
| 2006/0041685 A1* | 2/2006 | Bracewell et al. | 709/246 |
| 2007/0168287 A1* | 7/2007 | McCarthy et al. | 705/51 |
| 2008/0096522 A1* | 4/2008 | Kuramatsu | 455/405 |

FOREIGN PATENT DOCUMENTS

| | | | |
|---|---|---|---|
| JP | 2002-26942 A | 1/2002 |
| JP | 2002-262220 A | 9/2002 |
| KR | 2001-0103011 A | 11/2001 |
| KR | 2003-0011096 A | 2/2003 |
| KR | 2003-0069635 A | 8/2003 |
| KR | 10-2004-0016055 A | 2/2004 |

OTHER PUBLICATIONS

Hodes et al., Shared Remote Control of a Video Conferencing Application: Motivation, Design, and Implementation, Google 1999, pp. 1-12.*

FA Panel Computer that Meets the Needs of the Field and Improves Reliability, Instrumentation Control Engineering, <http://www.ice-keiso.co.jp>vol. 47, No. 3, 2004.

Visym Telecommunication, Compass 2002.

Push, Netcaster Active Channel, Hello! PC, Soft Bank Corp., Aug. 10, 1997.

* cited by examiner

CONTENT DISPLAY SYSTEM FOR SHARING CONTENT BETWEEN DISPLAY APPARATUSES

CROSS-REFERENCE TO RELATED APPLICATION

This application claims priority from Korean Patent Application No. 10-2004-0064102 filed on Aug. 14, 2004 in the Korean Intellectual Property Office, the disclosure of which is incorporated herein by reference in its entirety.

BACKGROUND OF THE INVENTION

1. Field of the Invention

The present invention relates to a service of displaying contents, and more particularly, to a system and method for efficiently providing contents by providing a plurality of display apparatuses and a single server which are connected through a network and perform predetermined message communication, and allowing the server to remotely control and monitor the display apparatuses.

2. Description of the Related Art

FIG. 1 is a schematic diagram of a conventional system 100 for providing a service of displaying contents.

The conventional system 100 includes display apparatuses 110, 130, and 150 and servers 120, 140, and 160, which are connected to the display apparatuses 110, 130, and 150, respectively, to provide contents. Content includes multimedia data such as music, images, and motion pictures and data having diverse text formats.

Various kinds of software programs are installed in, or independent hardware is provided to, each of the servers 120, 140, and 160 to convert content stored therein into a format suitable for the corresponding display apparatus 110, 130, or 150 to output. Accordingly, the output format of content selected by a server manager is converted using the software program or the hardware, and the converted content is output by a display apparatus.

Meanwhile, a display apparatus may include a function that allows a user to select content, receives the selected content from a server, and outputs the content. In this case, the display apparatus serves as a client.

FIG. 2 illustrates a method of providing a service such as content display between such client and server.

In operation S210, a client connects with a server using address and port information of the server while the server is operating. In operation S220, the client requests a service from the server. In operation S230, the server retrieves the requested service and provides the service to the client.

According to a conventional system like that shown in FIG. 1, a separate server having a function of converting the format of content is needed for each display apparatus and a server manager needs to personally select content to be output through the display apparatus. In addition, when a client-server structure shown in FIG. 2 is used, the server has difficulty in controlling a display apparatus corresponding to the client and monitoring the changes in the physical state of the display apparatus. The server may control the display apparatus using Universal Plug-and-Play (UPnP), which is one of the home network standards. In the UPnP, a remote control and monitoring service is implemented based on HyperText Markup Language (HTML). Accordingly, an HTML browser and parser are needed to analyze a message set and hardware or software having HyperText Transfer Protocol (HTTP) level performance is needed to perform a UPnP protocol. However, when the remote control and monitoring service is provided using the UPnP, a message set for a remote control command to be provided is valid only when it is defined in the UPnP. As a result, there are a lot of restrictions in extension of the remote control command and a method of monitoring the changes in state of a display apparatus using a server. Moreover, even when just a simple remote control command is performed, an HTTP server for performing the UPnP protocol and a software program such as an HTML parser are needed.

Therefore, to overcome these conventional problems, an apparatus and method for displaying contents, by which a server efficiently provides contents to display apparatuses and remotely control and monitor the display apparatuses efficiently, are desired.

SUMMARY OF THE INVENTION

The present invention may provide a system for displaying content, by which the content is automatically provided to a plurality of display apparatuses having a message communication function using a single server.

The present invention may also provide a system for displaying content, by which a plurality of display apparatuses having a message communication function are remotely controlled using a single server and a change in the physical state of each of the plurality of display apparatuses is monitored.

The above stated aspects as well as other aspects, features and advantages, of the present invention will become clear to those skilled in the art upon review of the following description.

According to an aspect of the present invention, there is provided a content display system for displaying content, including a first local interface module connected to a storage device storing the content, a first device interface module receiving a message requesting the content stored in the storage device, a first display apparatus including a first device agent module extracting the requested content from the storage device through the first local interface module and transmitting the extracted content through the first device interface module, a second device agent module generating the message, a second device interface module transmitting the generated message to the first display apparatus and receiving the extracted content, a content processing module converting the received content into content having an output format suitable for display, and a second display apparatus including a display module outputting the converted content.

According to another aspect of the present invention, there is provided a content display system for displaying content, including a local interface module connected to a storage device storing the content, a device interface module receiving a message requesting the content stored in the storage device, and a device agent module extracting the requested content from the storage device through the local interface module and transmitting the extracted content through the device interface module.

According to still another aspect of the present invention, there is provided a content display system for displaying content, including a device agent module generating a message requesting the content stored in the storage device, a device interface module transmitting the generated message to another display apparatus including the storage device and receiving the requested content, a content processing module converting the received content into content having an output format suitable to display, and a display module outputting the converted content.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
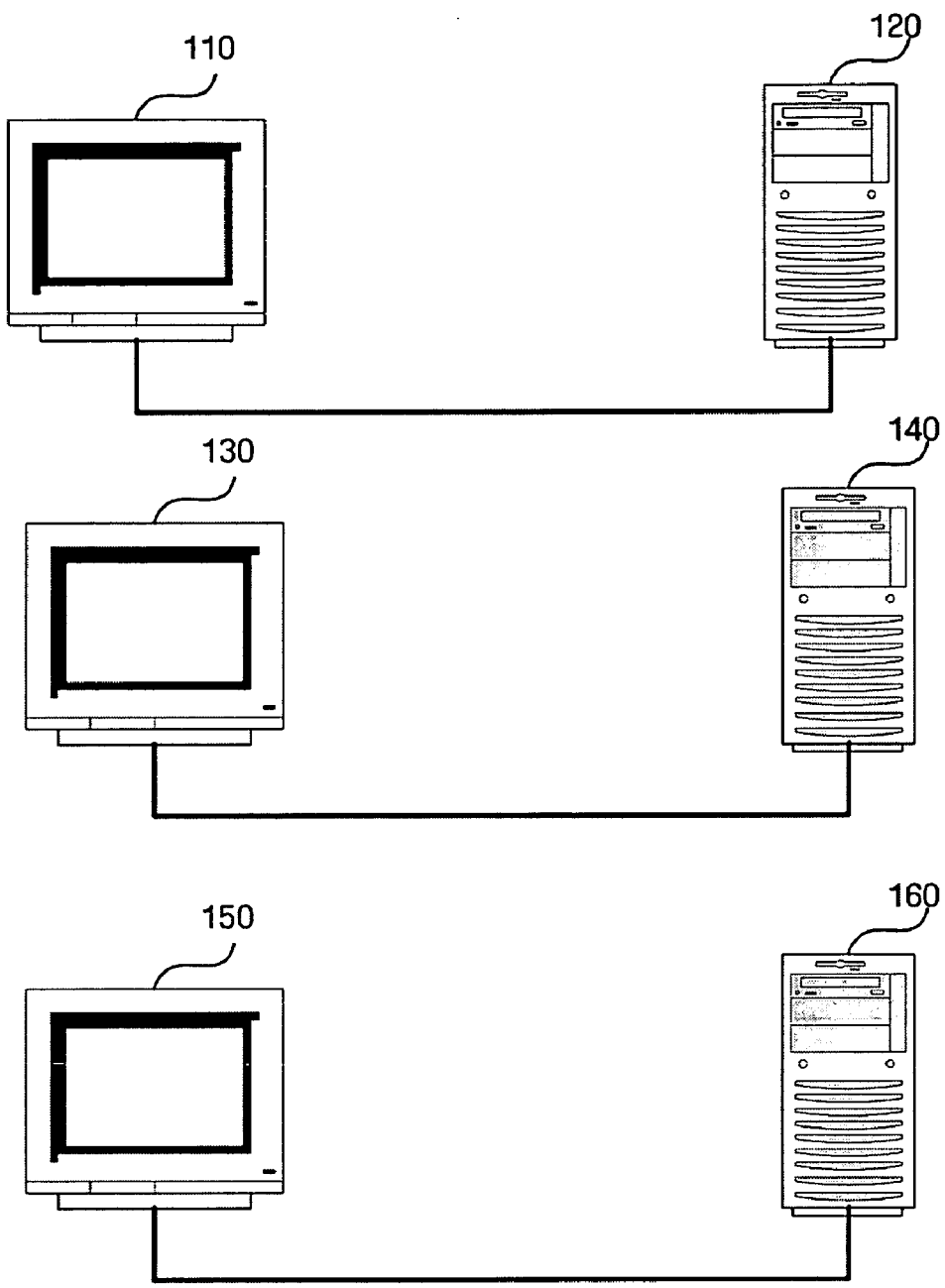
FIG. 1 is a schematic diagram of a conventional system for providing a service of displaying contents.
Figure 2:
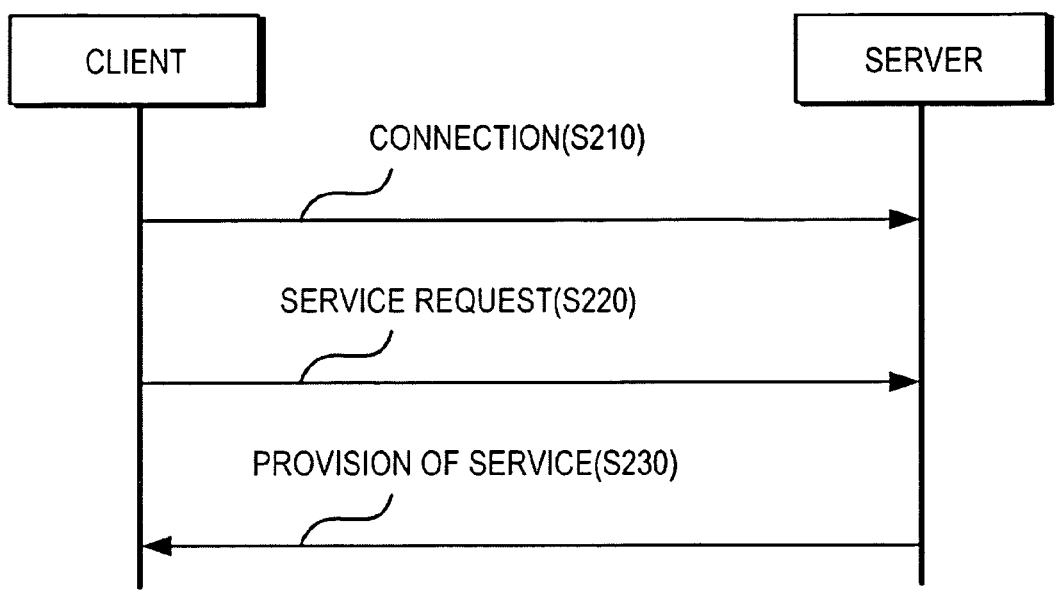
FIG. 2 illustrates a conventional method of providing a service between a client and a server.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

A content display system of the present invention is described hereinafter with reference to flowchart illustrations of methods according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Figure 3:
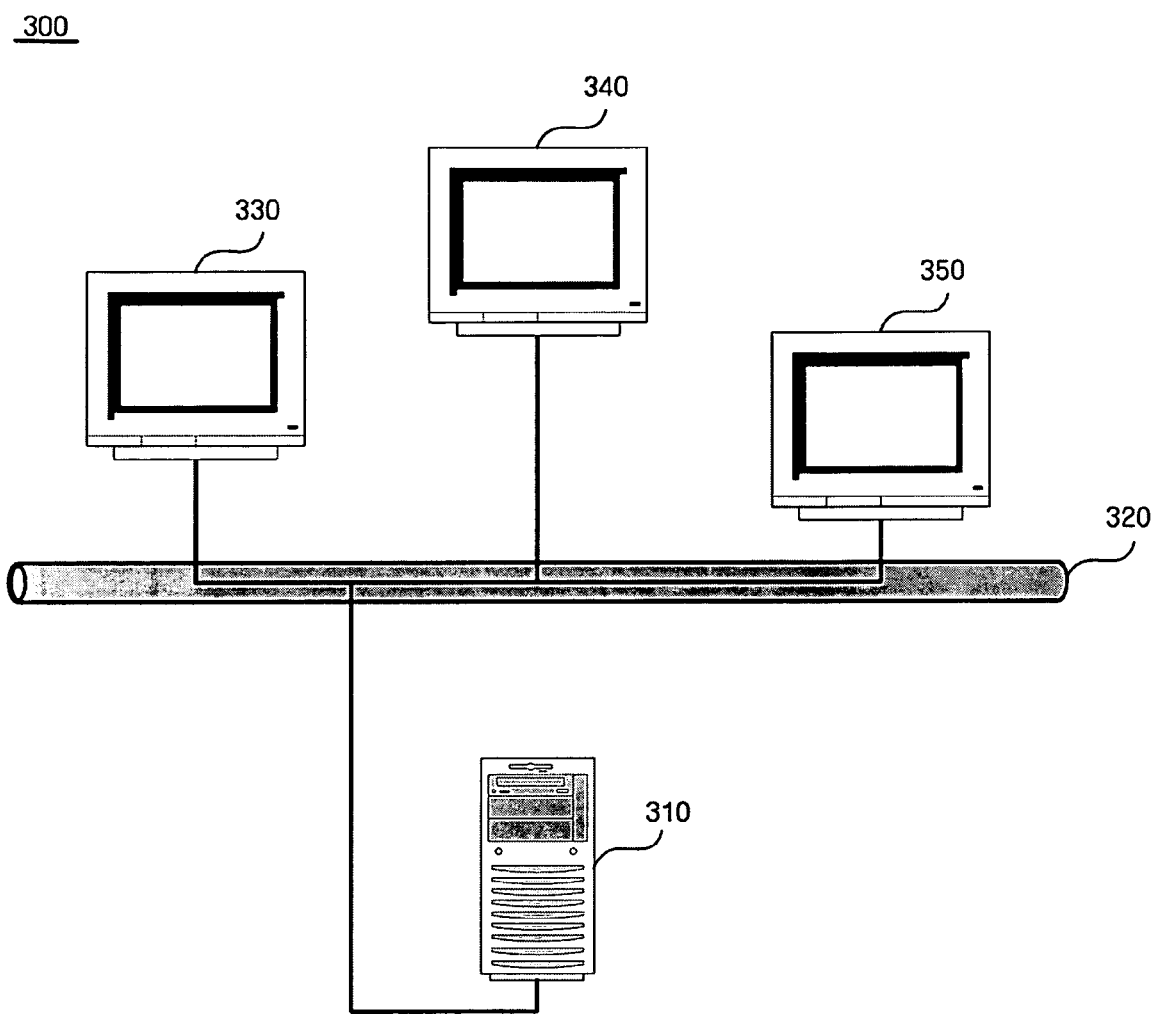
FIG. 3 is a schematic diagram of a system for providing a service of displaying contents according to an embodiment of the present invention.

FIG. 3 is a schematic diagram of a system 300 for providing a service of displaying contents according to an embodiment of the present invention. The system 300 includes a server 310, a plurality of display apparatuses 330, 340, and 350 which receive content from the server 310 and output it, and a transmission medium 320 connecting the server 310 with the plurality of display apparatuses 330, 340, and 350. Preferably, but not necessarily, each of the display apparatuses 330, 340, and 350 may be a television, a monitor, or a large display apparatus such as an electric signboard.

Unlike a conventional system, the server 310 provides content stored therein to a particular display apparatus 330, 340, or 350 according to a predetermined schedule, and the display apparatus 330, 340, or 350 receives the content, and converts the same into content having an output format suitable for display. Accordingly, the display apparatuses 330, 340, and 350 are equipped with hardware or software for converting diverse formats of data constituting content.

In addition, the server 310 can remotely control the display apparatuses 330, 340, and 350 and monitor state changes occurring in the display apparatuses 330, 340, and 350.

Meanwhile, information is transferred between the server 310 and each of the display apparatuses 330, 340, and 350 using a message communication method, which will be described later.

Figure 4:
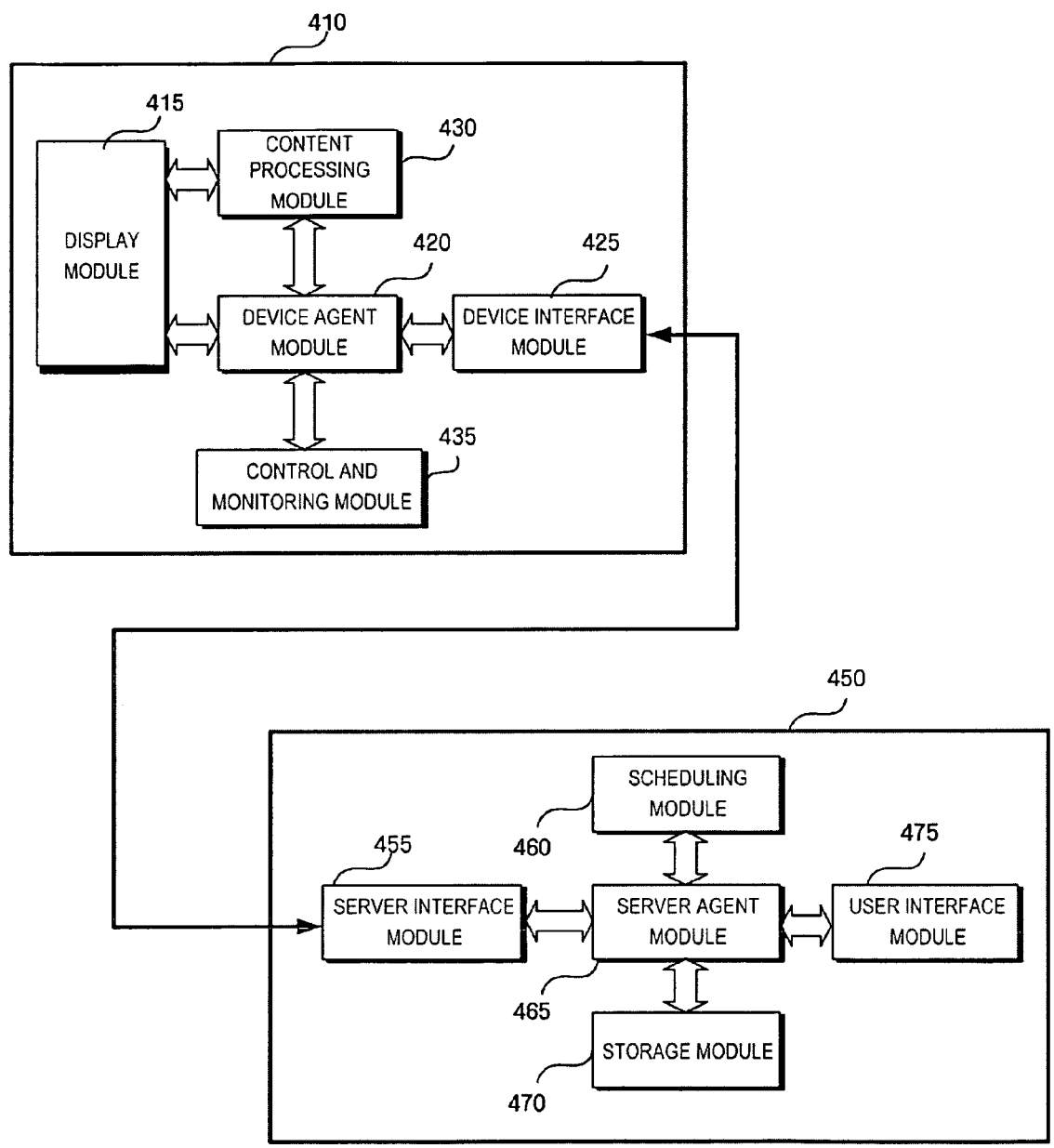
FIG. 4 illustrates a display apparatus and a server for providing a service of displaying contents according to an embodiment of the present invention.

FIG. 4 illustrates a display apparatus 410 and a server 450 for providing a service of displaying contents according to an embodiment of the present invention.

The display apparatus 410 includes a display module 415, a device agent module 420, a device interface module 425, a content processing module 430, and a control and monitoring module 435.

The display module 415 displays content received from the server 450, and provides a user with a means for allowing the user to request a particular content stored in the server 450.

The device interface module 425 automatically senses another display apparatus and the server 450 which are connected thereto through a network, extracts information on the sensed display apparatus and information on the server 450, and performs message communication with the sensed display apparatus or the server 450.

The content processing module 430 converts content received from the server 450 into an appropriate content to be suitable to an output format of the display apparatus 410 and transmits the converted content to the display module 415.

When the display apparatus 410 receives a message about a control command from the server, the control and monitoring module 435 performs an operation corresponding to the message. In addition, the control and monitoring module 435 senses a state change occurring in the display apparatus 410.

The device agent module 420 analyzes messages received through the device interface module 425 and performs operations corresponding to the messages. In addition, the device agent module 420 controls the display module 415, the control and monitoring module 435, and the content processing module 430 to accomplish smooth operations thereamong.

The server 450 includes a server interface module 455, a scheduling module 460, a server agent module 465, a storage module 470, and a user interface module 475.

The server interface module 455 automatically senses a plurality of display apparatuses connected therewith through a network, extracts information on each sensed display apparatus, and performs message communication with the plurality of display apparatuses.

The storage module 470 stores sound files such as music, image files such as photos, video files such as motion pictures, and text files having diverse formats.

The user interface module 475 allows a server manager to search for content stored in the storage module 470 using a keyword or an index and allows the server manager to register a schedule indicating what content is transmitted to what display apparatus at what time. In addition, the user interface module 475 allows the server manager to input a remote control command so that the server manager can remotely control the plurality of display apparatuses and shows information on state changes occurring in the plurality of display apparatuses.

The scheduling module 460 manages the schedule information and transmits a particular content to a designated display apparatus at a particular instant of time.

The server agent module 465 analyzes messages received through the server interface module 455 and performs operations according to the messages. In addition, the server agent module 465 controls the user interface module 475, the scheduling module 460, and the storage module 470 to accomplish smooth operation thereamong.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more computers in a communication system.

Hereinafter, operations between the modules will be described in detail. For clarity of the description, a procedure for displaying content and a procedure for remote control and monitoring will be described separately.

1. Content Display Service (1) Mutual Recognition between a Display Apparatus and a Server The server 450 and the display apparatus 410 are connected to a single network group through the server interface module 455 and the device interface module 425, respectively. Here, the server 450 may be connected with a plurality of display apparatuses, but for clarity, the description will be set forth with respect to a single display apparatus, and it is assumed that the structure of other display apparatuses is the same as that of the display apparatus 410 show in FIG. 4.

Each of the server interface module 455 and the device interface module 425 senses whether a display apparatus or a server connected thereto has been supplied with power to operate. For example, in the server 450, the server interface module 455 senses the display apparatus 410 and transmits the sensing result to the server agent module 465. Then, the server agent module 465 provides a server manager with information on the state of the display apparatus 410 through the user interface module 475. Accordingly, the server manager can check the states of display apparatuses at a place where the server 450 is located, without directly visiting places where display apparatuses are installed to manually check them.

(2) Scheduling

To display content on the display apparatus 410, a server manager searches for the content stored in the storage module 470 by inputting a keyword and an index through the user interface module 475. Next, the server manager decides an instant of time, i.e., a display time when the searched content is to be displayed on the display apparatus 410 and inputs the instant of time through the user interface module 475.

Information on the searched content and schedule information on the display apparatus 410 that will display the searched content and a display time of the searched content are managed by the scheduling module 460. Accordingly, the scheduling module 460 transmits the schedule information to the server agent module 465 at the display time. Then, the server agent module 465 fetches the content from the storage module 470 and transmits it to the display apparatus 410 through the server interface module 455.

(3) Outputting of Content

When the display apparatus 410 receives data from the server 450 through the device interface module 425, the device agent module 420 determines whether the received data is for outputting content or for controlling the display apparatus 410.

When it is determined that the received data is for outputting content, that is, when content is transmitted from the server 450 according to the operation of the scheduling module 460, the device agent module 420 transmits the received data to the content processing module 430.

The content processing module 430 converts the content received from the device agent module 420 into content having an output format suitable to the display apparatus 410 and drives an application program to output the converted content. The content reproduced through the application program is provided to a user through the display module 415.

Meanwhile, the user of the display apparatus 410 may request a particular content from the server 450 through the display module 415. In this case, the display module 415 is provided with a function allowing the user to input content information. Here, the display apparatus 410 may receive a content list stored in the storage module 470 from the server 450 in advance and provide the content list to the user through the display module 415 at the user's request for content. Alternatively, only in response to the user's request for content, the display apparatus 410 may request the content list stored in the storage module 470 from the server 450.

(4) Application Examples

Several representatives of application examples of the present invention will be described below.

i) Electronic Art Gallery

The server 450 converts works of art possessed by an art gallery into high-definition image data and stores them in the storage module 470. The display apparatus 410 is installed in the art gallery or a public space having a space for exhibition and connected to the server 450 through a network.

A server manager inputs schedule information including the order in which image data are displayed on the display apparatus 410 and display related information through the user interface module 475 and registers the schedule information in the scheduling module 460. The scheduling module 460 transmits the schedule information to the server agent module 465 at a designated time. The server agent module 465 fetches the image data from the storage module 470 based on the schedule information and transmits the image data to the display apparatus 410 through the server interface module 455 so that a user can view the works of art.

ii) Airport Information Service

The server 450 stores an airport guide, airline information, advertisements, entertainment video/audio contents, etc. in the storage module 470. The display apparatus 410 is installed at a desired place within an airport and connected to the server 450 through a network.

The scheduling module 460 of the server 450 manages the order and content of information to be provided to the display apparatus 410. The server transmits a particular content to the display apparatus 410 at a predetermined time. The display apparatus 410 receives the content, converts it into content having an output format suitable for displaying the same on a screen.

iii) Presentation Information Service

The server 450 stores contents of information and presentation materials in the storage module 470. The display apparatus 410 is installed at a desired place in a public space and is connected to the server 450 through a network.

The scheduling module 460 of the server 450 manages the order and content of information and presentation materials to be provided to the display apparatus 410. The server transmits a particular content to the display apparatus 410 at a predetermined time. The display apparatus 410 receives the content, converts it into content having an output format suitable for displaying the same on a screen.

2. Remote Control and Monitoring

The server 450 can remotely control the display apparatus 410 according to the state of the display apparatus 410. For remote control, the server 450 and the display apparatus 410 have a remote control message set and particularly the display apparatus 410 includes the control and monitoring module 435.

For example, when a server manager wants to turn on or off the power of the display apparatus 410 or control an output state such as volume or contrast of the display apparatus 410, the server manager inputs a control command through the user interface module 475. Here, the user interface module 475 provides the user with user interface for controlling the display apparatus 410.

In addition, the server 450 can remotely command navigation motions such as stop, pause, forward, and backward with respect to content output by the display apparatus 410.

Meanwhile, the control and monitoring module 435 of the display apparatus 410 senses an event periodically or when the event occurs and inputs information on a sensed state change to the device agent module 420. The device agent module 420 transmits the information to the server 450 through the device interface module 425. As a result, the server 450 can remotely monitor the state of the display apparatus 410.

The detailed description of the remote control and monitoring between the display apparatus 410 and the server 450 will be set forth later.

Meanwhile, message communication is performed between the display apparatus 410 and the server 450, which will be described in detail below. For clarity of the description, the display apparatus is referred to as a client and described with reference to FIG. 4. The server agent module 455 in the server 450 and the device agent module 420 in the client will perform operations of generating a packet and analyzing a received message to perform the message communication.

Figure 8:
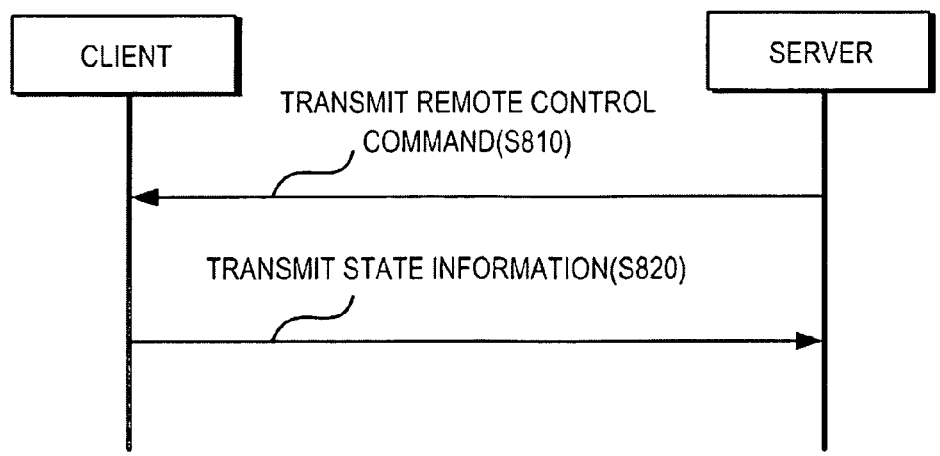
FIG. 8 illustrates a procedure for performing a remote control service according to an embodiment of the present invention.
Figure 9A:
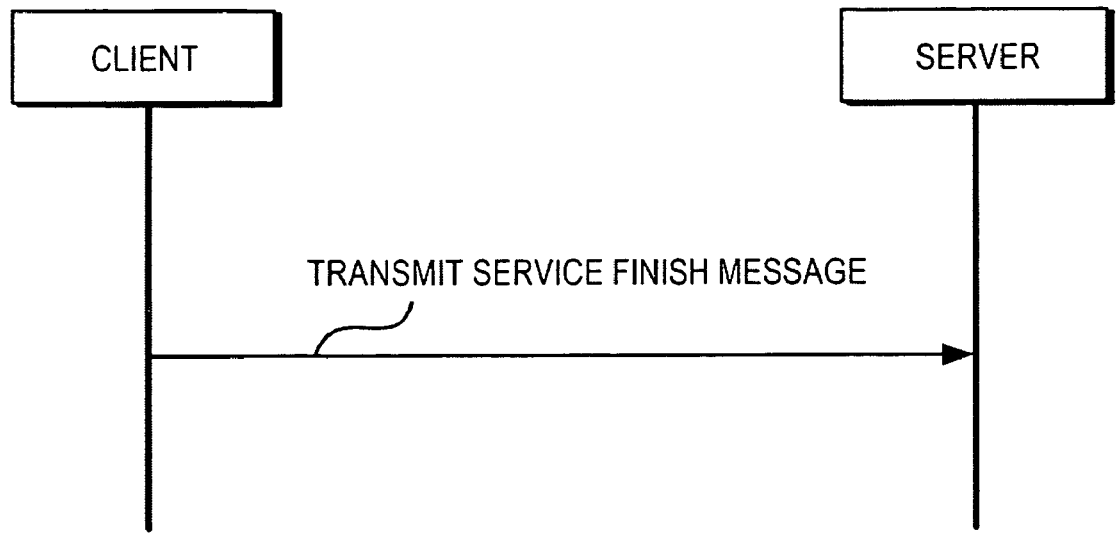
FIGS. 9A and 9B illustrate procedures for finishing a service according to an embodiment of the present invention.
Figure 9B:
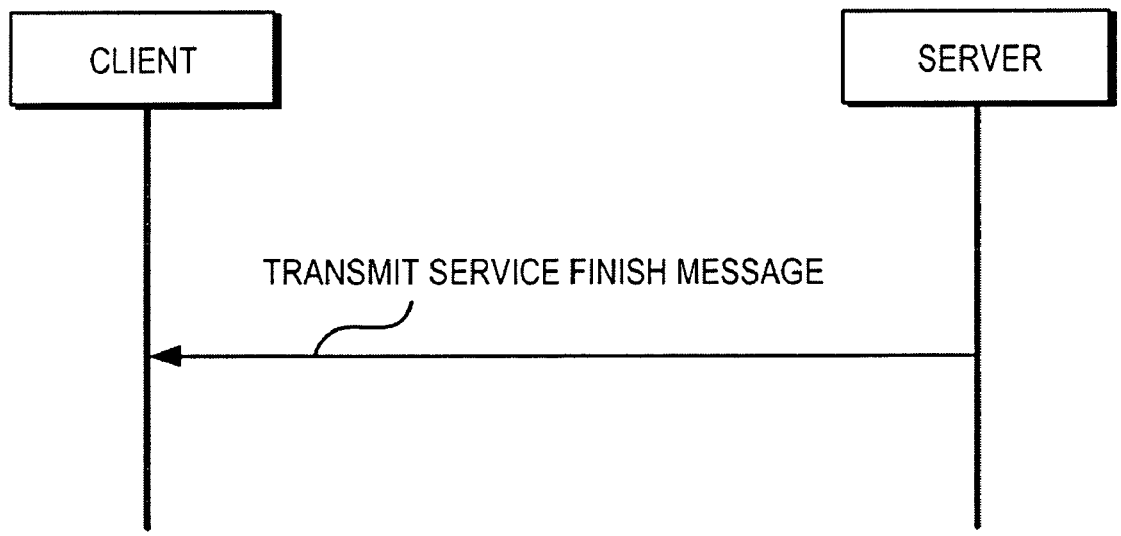

A message communication protocol according to an embodiment of the present invention is largely divided into i) message communication for registering a client as a service target of a server and starting a service (see FIG. 5); ii) message communication managed by the client for a pull mode service of the server (see FIG. 6); iii) message communication for a push mode service from the server to the client (see FIG. 7); iv) message communication for remote control performed by the server with respect to the client (see FIG. 8); and v) message communication for finishing a service between the server and the client (see FIGS. 9A and 9B).

In an example of the pull mode service, there is a server providing music, and a client selects a desired music title from a list of music titles stored in the server and takes a service of the desired music title from the server.

In an example of the push mode service, monitors supporting a network function are installed at many places in a waiting room of a bus terminal or a train station, and a server provides the monitors with departure and arrival times of a train or a bus, announcements, movies, music, etc.

Figure 5:
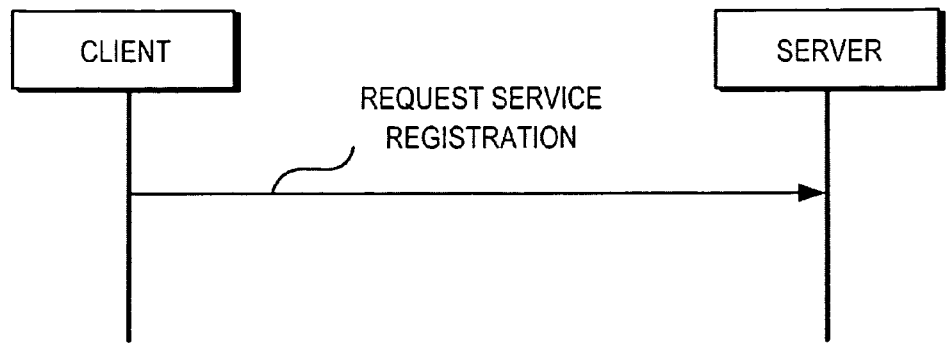
FIG. 5 illustrates a service registration procedure according to an embodiment of the present invention.

FIG. 5 illustrates a service registration procedure according to an embodiment of the present invention. In the service registration procedure, the client registers information on the client in the server to use a service provided by the server.

Here, a packet used for the service registration has a payload including information as follows:

Service registration packet payload={Media access control (MAC) address, Service type, Group name, Client name} wherein the "MAC address" is a unique identification number allocated to a network card included in the device interface module 425 and is also used as an identifier for identifying the client. In addition, the MAC address can also be used when the server turns on the power of the client through remote control.

The "service type" is a unique identifier for identifying a service of a different server.

The "group name" is the name of a group for managing the clients in a different group.

The "client name" is an alias of the client, which is familiar with a user, and is used to identify the client.

When the client sends a service registration request to the server, as shown in FIG. 5, the server agent module 465 of the server checks the service type and the group name. If the service type is supported by the server and the group name corresponds to a group managed by the server, the server agent module 465 stores information on the client requesting registration in the storage module 470. Here, the server may be set to provide a service to a particular group or to clients in all groups. In addition, the server may manage the list of registered clients by groups or may provide discriminated services to different groups, respectively.

Figure 6:
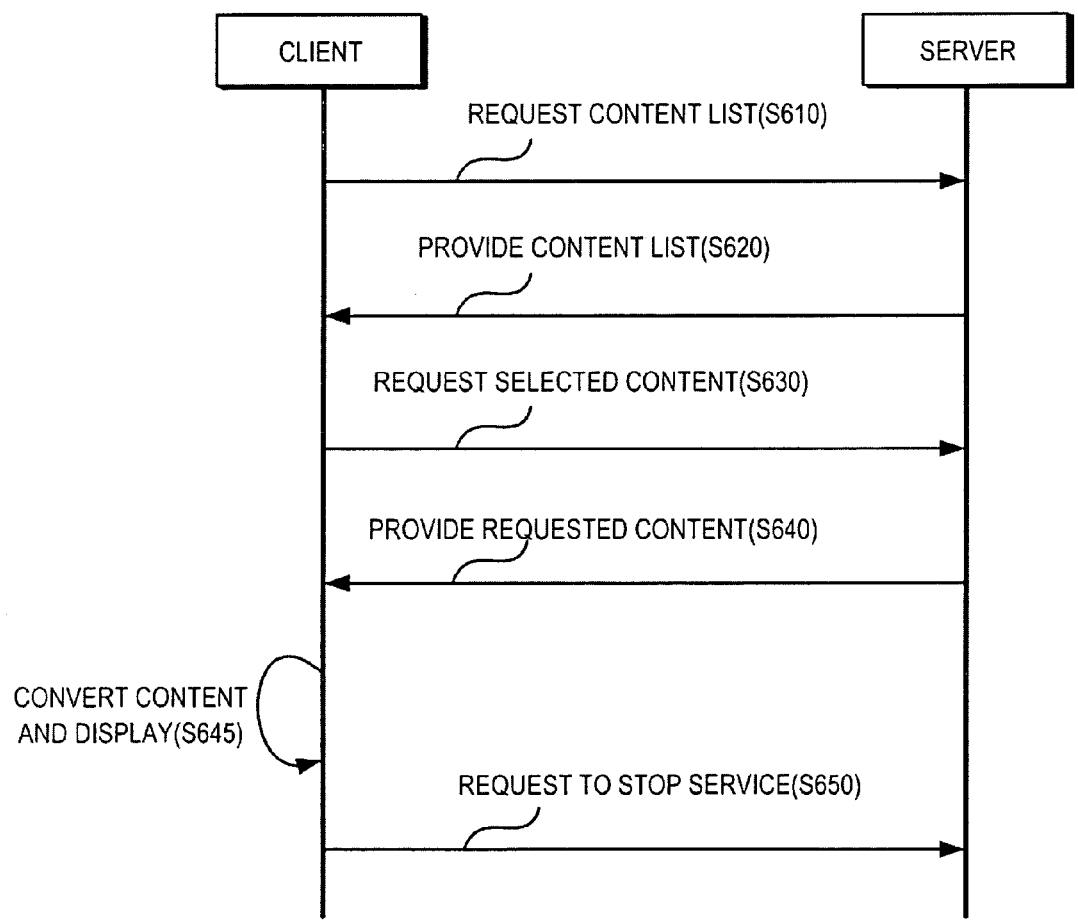
FIG. 6 illustrates a procedure for performing a pull mode service according to an embodiment of the present invention.

FIG. 6 illustrates a procedure for performing a pull mode service according to an embodiment of the present invention. When the client uses content selected from a content list provided by the server, the pull mode service is performed.

Packets used for the pull mode service have payloads including information as follows:

Pull mode content list request packet payload={Service type, Group name, Client name, Media type, List sorting information, List request information}

Pull mode content list packet payload={Service type, Server name, Media type, Content list information, Server service network information}

Pull mode content request packet payload={Service type, Group name, Client name, Content information}

Pull mode content finish packet payload={Service type, Group name, Client name, Media type}.

Here, the "media type" indicates a type of media, such as movies, music, photos, or document files, corresponding to a relevant content.

The "list sorting information" indicates parameter information such as a name, a date, a file size, or a genre by which contents are sorted on a list.

The "list request information" indicates the number of lists per page and the position of a page.

The "content list information" indicates a list of content information, i.e., a content list for a particular media type.

The "server service network information" is information on network connection through which the server provides a service and may include an Internet Protocol (IP) address and a port number.

When multicast is required according to a type of service, the "server service network information" may further include an IP address and a port number for multicast.

The "content information" is information about each content and includes a file name, a file length, a creation date, a genre, a running time, thumbnails, etc. of the content.

Referring to FIG. 6, in operation S610, the device agent module 420 of the client requests a content list for particular media from the server through the device interface module 425 in a pull mode. Here, the client transmits a "pull mode content list request packet" to the server.

The server agent module 465 of the server checks whether a requested service type is supported by the server and whether the client is a member of a group admitted by the server.

Thereafter, in operation S620, the server agent module 465 fetches contents corresponding to the particular media among contents serviced by the server from the storage module 470, creates a content list, and transmits the content list to the client using a "pull mode content list packet".

In operation S630, the client selects a desired content from the content list and requests the selected content from the server using a "pull mode content request packet".

In operation S640, the server checks whether a requested service type is supportable and whether the client is an admitted client and starts a pull mode service of the requested content. When the client wants to stop the pull mode service, the client can stop the pull mode service by transmitting a "pull mode content finish packet" to the server in operation S650.

Figure 7:
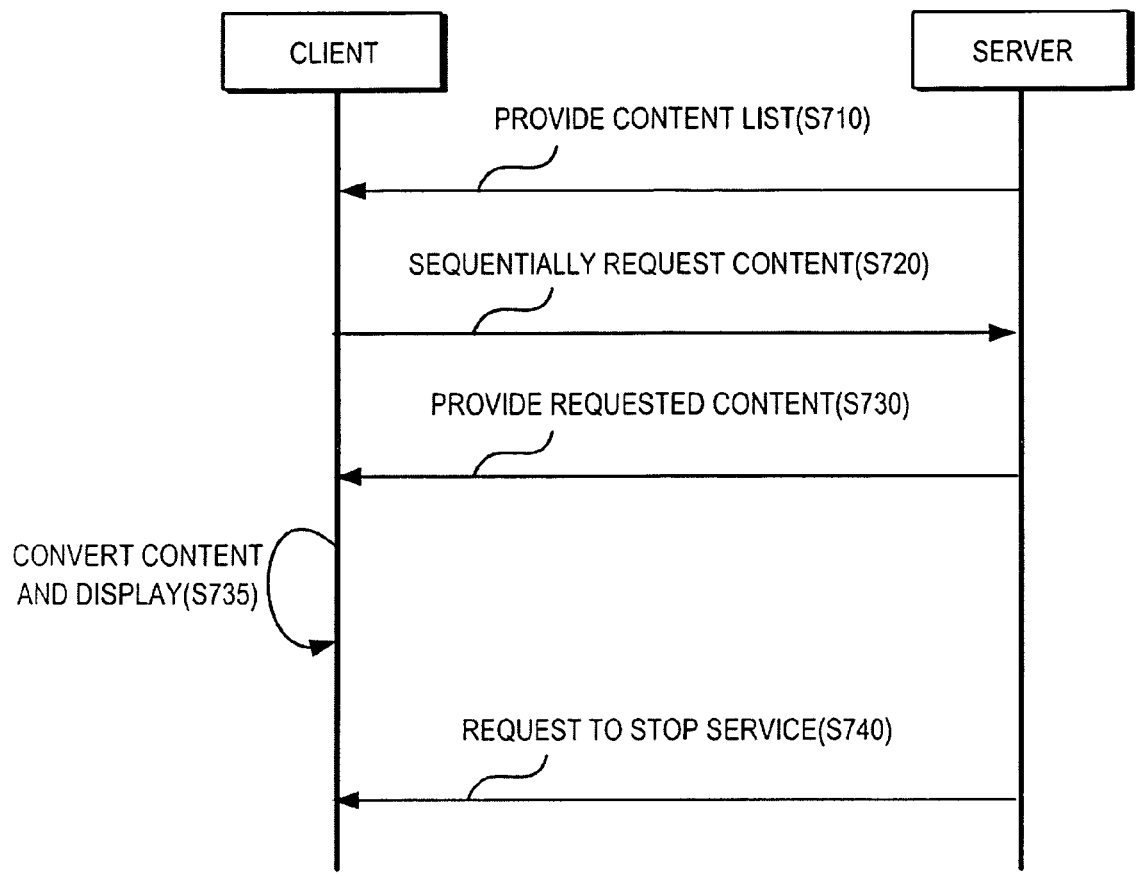
FIG. 7 is illustrates a procedure for performing a push mode service according to an embodiment of the present invention.

FIG. 7 illustrates a procedure for performing a push mode service according to an embodiment of the present invention. The push mode service may be used when the server provides content to the client according to the operation of the scheduling module 460.

Here, packets used for the push mode service have payloads including information as follows:

Push mode content list packet payload={Service type, Server name, Media type, Content list information, Server service network information}

Push mode content request packet payload={Service type, Group name, Client name, Content information}

Push mode content finish packet payload={Service type, Server name, Media type}.

Referring to FIG. 7, in operation S710, the server transmits a content list to the client connected thereto in a push mode. Here, a "push mode content list packet" is used.

In operation S720, the client requests the server to transmit content on the content list according to a predetermined sequence by sending a "push mode content request packet".

In operation S730, the server checks whether a requested service type is supportable and whether the client is an admitted client and starts a push mode service of the requested content. Operations S720 and S730 are repeated with respect to all contents on the content list that the client receives.

In operation S740, the server can stop the push mode service by transmitting a "push mode content finish packet" to the client.

FIG. 8 illustrates a procedure for performing a remote control service according to an embodiment of the present invention. The remote control service can be used when the server remotely controls a video or audio mode of the client and remotely monitors the state of the client.

Packets used for the remote control service have payloads including information as follows:

Remote control packet payload={Service type, Server name, Remote control command, Remote control command parameter}

Client state packet payload={Service type, Server name, Client state information}.

Here, the "remote control command" indicates a control executed by the server with respect to the client. For example, the remote control command may be Power ON/OFF, Wake on LAN, Adjust Contrast, Adjust Tint, Adjust Brightness, Adjust Volume, Adjust Video Mode, or Adjust Audio Mode. The Wake on LAN is a process of multicasting MAC address information of a network card to a local LAN and turning ON the power of a CPU connected to the network card.

The "remote control command parameter" is a parameter corresponding to the remote control command.

The "client state information" is state information including volume, a video mode, an audio mode, contrast, tint, and/or brightness of the client.

In the remote control service, as shown in FIG. 8, in operation S810, the server transmits a remote control command to the client using a "remote control packet."

The device agent module 420 of the client analyzes a packet received from the server to determine whether the packet is involved in the remote control command. When it is determined that the packet is involved in the remote control command, the device agent module 420 transmits information on the remote control command to the control and monitoring module 435. The control and monitoring module 435 executes the remote control command and reports a changed state resulting from the execution to the device agent module 420. In operation S820, the device agent module 420 transmits the changed state reported by the control and monitoring module 435 to the server through the device interface module 425. Here, a "client state packet" is transmitted.

FIGS. 9A and 9B illustrate procedures for finishing a service according to an embodiment of the present invention. A service finishing procedure may be performed when the client or the server informs each other of the finish of its service.

Packets used to finish service have payloads including information as follows:

Client service finish packet payload={MAC address, Service type, Group name, Client name}

Server service finish packet payload={Service type, Server name}

The procedure shown in FIG. 9A is performed when the client finishes a service. Referring to FIG. 9A, the client transmits a "client service finish packet" to the server.

The procedure shown in FIG. 9B is performed when the server finishes a service. Referring to FIG. 9B, the server transmits a "server service finish packet" to the client. Here, the server transmits a service finish message to every client connected thereto.

In addition, a message for periodically checking whether the server and the client are connected to each other can be transmitted and received therebetween. By using this message, the server and the client can recognize an abnormal termination of each other's service. A packet used to check the connection between the server and the client has a payload including information as follows:

Connection check packet payload={MAC address, Service type, Group name, Client name}.

A system for displaying content according to an embodiment of the present invention allows a plurality of display apparatuses to receive contents from a single server and to display the contents and also allows the server to control the display apparatuses and monitor state changes occurring in display apparatuses. In other words, according to the present invention, a display apparatus not only outputs content but also executes various functions by performing message communication with the server as described above.

Figure 10:
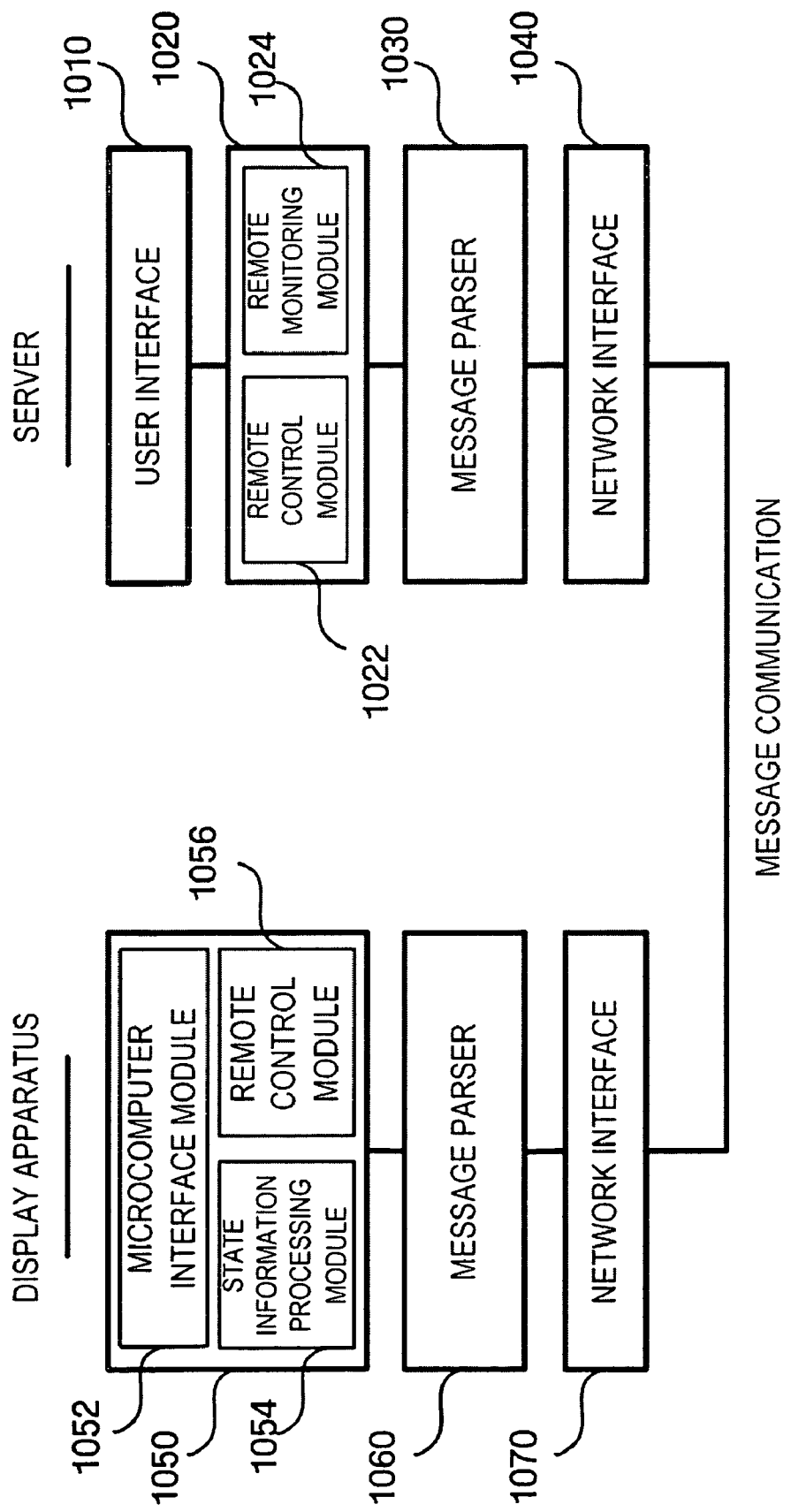
FIG. 10 is a block diagram of a remote control and monitoring system according to an embodiment of the present invention.

FIG. 10 is a block diagram of a remote control and monitoring system according to an embodiment of the present invention.

For remote control and monitoring, in a server, a user interface 1010, a server remote control and monitoring module 1020 including a remote control module 1022 and a remote monitoring module 1024, a message parser 1030, and a network interface 1040 operate.

The user interface 1010 is provided by the user interface module 475 shown in FIG. 4 and provides interface allowing a server manager to control a display apparatus 410 and to know state information of the display apparatus 410.

The message parser 1030 generates a message for controlling the display apparatus 410 and analyzes a message regarding state information received from the display apparatus 410. The function of the message parser 1030 can be performed by the server agent module 465 shown in FIG. 4.

The remote control module 1020 transmits control information received from the user interface 1010 to the message parser 1030. The remote monitoring module 1024 transmits state information of the display apparatus 410, which is analyzed by the message parser 1030, to the user interface 1010.

The remote control module 1022 and the remote monitoring module 1024 may be included in the server agent module 465 or the user interface module 475.

The network interface 1040 of the server 450 can be provided by the server interface module 455 shown in FIG. 4.

Meanwhile, in the display apparatus 410, a client control and monitoring module 1050 including a microcomputer interface module 1052, a state information processing module 1054, and a remote control module 1056; a message parser 1060; and a network interface 1070 operate.

The network interface 1070 of the display apparatus 410 can be provided by the device interface module 425 shown in FIG. 4.

The message parser 1060 generates a message including state information of the display apparatus 410 or event information and analyzes a message regarding control information received from the server 450. The function of the message parser 1060 may be performed by the device agent module 420 shown in FIG. 4.

The remote control module 1056 transmits the control information analyzed by the message parser 1060 to the microcomputer interface module 1052. The state information processing module 1054 senses and transmits an event occurring in the display apparatus 410 or a state change resulting from the control over the display apparatus 410 to the message parser 1060.

The microcomputer interface module 1052 is a module for controlling the hardware elements of the display apparatus 410. The microcomputer interface module 1052 receives control information from the remote control module 1056 and controls a relevant hardware element according to the control information.

The remote control module 1056, the state information processing module 1054, and the microcomputer interface module 1052 may be included in the control and monitoring module 435 shown in FIG. 4.

The remote control and monitoring function performed with respect to the display apparatus 410 will be separately described in terms of: i) remote control of the display apparatus 410 by a server manager; and ii) monitoring of a state change in the display apparatus 410.

1. Remote Control of the Display Apparatus 410 by a Server Manager

For example, in turning off the power of the display apparatus 410, the server manager checks the power states of display apparatuses through the user interface 1010 provided by the user interface module 475.

When the server manager selects the display apparatus 410 to be turned off, the remote control module 1022 receives and transmits the selection of the server manager to the message parser 1030. The message parser 1030 creates a message for remote control and transmits the message to the display apparatus 410 through the network interface 1040 of the server 450.

The display apparatus 410 receives the message through the network interface 1070. The message parser 1060 analyzes the received message and transmits analyzed information to the remote control module 1056. Since the operation of turning on or off the power corresponds to a control over hardware elements, the remote control module 1056 drives the microcomputer interface module 1052 to turn off the power of the display apparatus 410.

Through such operations, values of volume, contrast, brightness, monitor input, etc. of display apparatuses can be adjusted.

2. Monitoring of a State Change in the Display Apparatus 410

State changes in the display apparatus 410 include a state change resulting from the control of the display apparatus 410 and a state change spontaneously occurring in the display apparatus 410, that is, a state change that is not controlled by the server 450. When a state change results from the control of the display apparatus 410, e.g., when the power state changes due to power ON/OFF control performed by the server 450, the state information processing module 1054 senses the changed state and transmits it to the message parser 1060. The message parser 1060 creates a message indicating state information and transmits the message to the server 450 through the network interface 1070.

The server 450 receives the message through the network interface 1040. The message parser 1030 analyzes the received message and transmits analyzed information to the remote monitoring module 1020. The remote monitoring module 1020 provides information on the state change to a server manager through the user interface 1010.

Meanwhile, with respect to a state change spontaneously occurring in the display apparatus 410 not resulting from control by the server 450, the server 450 may periodically receive state information from all display apparatuses connected to a network. The state information may include a list of connected display apparatuses, a network connection state of each display apparatus, a current service status of each display apparatus, etc. In addition, the same screen as that of the display apparatus 410 which is reproducing content may be displayed on the server 450. Furthermore, the server 450 may control the display apparatus 410 to automatically operate to cope with a major event occurring in the display apparatus 410.

Figure 11:
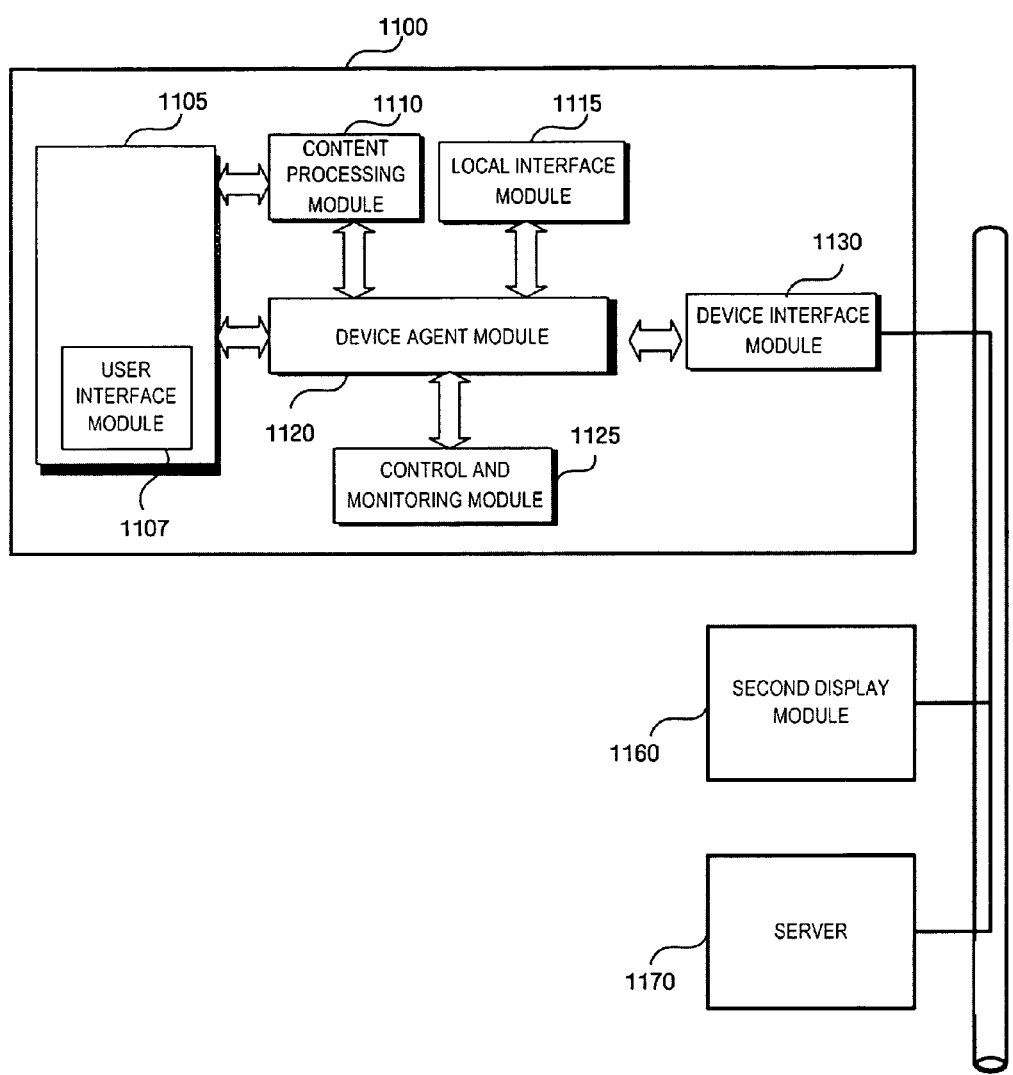
FIG. 11 is a block diagram of a display apparatus for sharing content between display apparatuses according to an embodiment of the present invention.

As described above, the display apparatuses are connected to a network using the above-described message communication method independently operate and share content. FIG. 11 is a block diagram of each of the display apparatuses for performing such a function.

A first display apparatus 1100 shown in FIG. 11 includes a display module 1105 having a user interface module 1107, a device agent module 1120, a device interface module 1130, a content processing module 1110, a control and monitoring module 1125, and a local interface module 1115. Here, various blocks of a second display apparatus 1160 are the same as those of the first display apparatus 1100, and a server 1170 has the same configuration as the server 450 shown in FIG. 4.

The display module 1105 displays content on a screen.

The user interface module 1107 allows a user to search for content stored in the first or second display apparatus 1100 or 1160 or the server 1170 and allows the searched content to be displayed on the display module 1105.

The device interface module 1130 automatically senses another display apparatus and the server connected thereto through a network, extracts information on the sensed display apparatus and information on the server, and performs message communication with the sensed display apparatus or the server.

The content processing module 1110 converts a message about a control command content received from the server 1170 or the second display apparatus 1160 or content stored in a predetermined storage medium connected to the local interface module 1115 to be suitable to an output format of the first display apparatus 1100 and transmits the converted content to the display module 1105.

When the first display apparatus 1100 receives a message about a control command from the server 1170 or the second display apparatus 1160, the control and monitoring module 1125 performs an operation corresponding to the message or senses a state change occurring in the first display apparatus 1100.

The local interface module 1115 is configured to be capable of interfacing with a portable storage medium such as a USB memory stick or a hard disk, or a storage medium stored in the first display apparatus 1100. For convenient explanation, in the following description, the portable storage medium will be made explained by way example.

The device agent module 1120 analyzes messages received through the device interface module 1130 and performs operations corresponding to the messages. In addition, the device agent module 1120 controls the display module 1105, the control and monitoring module 1125, the content processing module 1110, and the local interface module 1115 to accomplish smooth operations thereamong.

The modules or components constituting the display apparatuses shown in FIG. 11 perform substantially the same functions as those shown in FIG. 4. Operations among various modules shown FIG. 11 other than the same and corresponding modules or components will now be described.

1. Sharing of Content

When a portable storage medium having a variety of content formats stored therein, e. g., a USB memory stick or a hard disk, is connected to the local interface module 1115, the device agent module 1120 extracts information on the content stored in the portable storage medium and manages the extracted information. In this case, the device agent module 1120 may include a separate module for performing this function.

The content stored in the portable storage medium may be provided as requested by the first display apparatus 1 100 or the second display apparatus 1160. Otherwise, the content stored in the portable storage medium may be provided from the server 1170.

The sharing of the content between display apparatuses may apply to the above-described pull mode service or the push mode service according to the present invention. This is because a client-server structure is also applicable for display apparatuses to share the content.

2. Search and Display of Content

When a user requests the user interface module 1107 to search for content stored in the portable storage device connected to the local interface module 1115 using the user interface module 1107, the device agent module 1120 extracts information on the content stored in the portable storage device through the portable storage device and provides the user with the extracted information through the display module 1105. When the user selects an arbitrary content, the device agent module 1120 extracts the selected content from the portable storage device and transmits the same to the content processing module 1110.

The content processing module 1110 converts the transmitted content into content having an output format suitable to the first display apparatus 1100, and then allows the converted content to be reproduced on a screen of the display module 1105 using the corresponding application program.

Meanwhile, in the same manner with the first display apparatus 1100 connected to the network, the user may also request the user interface module 1107 to search for content through another display apparatus such as the second display apparatus 1160. For example, when there is a request from the second display apparatus 1160 to search for content stored in the portable storage device connected to the first display apparatus 1100, the device agent module 1120 extracts corresponding content from the portable storage device and transmits the extracted content to the second display apparatus 1160 through the device interface module 1130.

3. Controlling of Display Apparatuses

If the user interface module 1107 provides the user with a control interfacing operation controlling other display apparatuses, controlling performed by the content display system can be decentralized. In other words, the content display system, which consists of the first display apparatus 1100 and the second display apparatus 1160 in the case of the illustrative embodiment, is controlled not only by the server 1170 but also by an authorized system manager through the control interface. In this case, in order to transmit the control command, the above-described message communication method may be used.

Meanwhile, a module searching for content stored in a portable storage medium connected to various display apparatuses may be mounted in the server 1170.

According to the present invention, contents are effectively provided to a plurality of display apparatuses using a single server. In addition, the contents can be shared between display apparatus to then be displayed.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

What is claimed is:

1. A content display system for displaying content, comprising:
a first display apparatus and a second display apparatus, wherein
the first display apparatus includes a first local interface module connected to a storage device storing the content,
a first device interface module receiving a message requesting the content stored in the storage device, and
a first device agent module extracting the requested content from the storage device through the first local interface module and transmitting the extracted content through the first device interface module; and wherein
the second display apparatus includes a second device agent module generating the message,
a second device interface module transmitting the generated message to the first display apparatus and receiving the extracted content,
a content processing module converting the received content into content having an output format suitable for display, and
a display module outputting the converted content, and wherein the first display apparatus and the second display apparatus are connected through a network, and wherein the first display apparatus performs a remote control of outputting the content in the second display apparatus through the network based on a state of the second display apparatus.

2. The content display system of claim 1, wherein the storage device comprises a portable storage device.

3. The content display system of claim 2, wherein the portable storage device comprises a USB memory stick.

4. The content display system of claim 2, wherein the first device agent module requests a server to transmit a particular content among contents stored in the server.

5. The content display system of claim 1, wherein the storage device comprises a storage device mounted in the first display apparatus.

6. The content display system of claim 1, wherein the message comprises a message complying with a pull mode.

7. The content display system of claim 1, wherein the message comprises a message complying with a push mode.

8. The content display system of claim 1, wherein the content processing module operates an application program for reproducing the converted content.

9. The content display system of claim 1, wherein the second display apparatus further comprises a user interface module allowing a user to input a request for the content stored in the storage device, and the second device agent module generates the message in response to the request.

10. A content display apparatus for displaying content, comprising:
a processor;
a local interface module connected to a storage device storing the content;
a device interface module receiving a message requesting the content stored in the storage device under control of the processor; and
a device agent module extracting the requested content from the storage device through the local interface module and transmitting the extracted content through the device interface module,
wherein the device interface module receives the message from a separate display apparatus which is connected to the content display apparatus through a network, and the content display apparatus performs a remote control of displaying the content in the separate display apparatus through the network based on a state of the separate display apparatus.

11. The content display apparatus of claim 10, wherein the storage device comprises a portable storage device.

12. The content display apparatus of claim 11, wherein the portable storage device comprises a USB memory stick.

13. The content display apparatus of claim 11, wherein the device agent module requests a server to transmit a particular content among contents stored in the server.

14. The content display apparatus of claim 10, wherein the storage device comprises a storage device mounted in the content display apparatus.

15. The content display apparatus of claim 10, wherein the message comprises a message complying with a pull mode.

16. The content display apparatus of claim 10, wherein the message comprises a message complying with a push mode.

17. A content display apparatus for displaying content, comprising:
a device agent module generating a message requesting the content stored in a storage device;
a device interface module transmitting the generated message to a separate display apparatus including the storage device and receiving the requested content;
a content processing module converting the content received from the storage device of the separate display apparatus into content having an output format suitable to display; and
a display module outputting the converted content,
wherein the content display apparatus and the separate display apparatus are connected through a network, and the outputting of the content is remotely controlled by the separate display apparatus through the network based on a state of the content display apparatus.

18. The content display apparatus of claim 17, wherein the storage device comprises a portable storage device.

19. The content display apparatus of claim 18, wherein the portable storage device comprises a USB memory stick.

20. The content display apparatus of claim 18, wherein the portable storage device comprises a hard disk.

21. The content display apparatus of claim 17, wherein the storage device comprises a storage device mounted in the content display apparatus.

22. The content display apparatus of claim 17, wherein the message comprises a message complying with a pull mode.

23. The content display apparatus of claim 17, wherein the message comprises a message complying with a push mode.

24. The content display apparatus of claim 17, wherein the content processing module operates an application program for reproducing the converted content.

25. The content display apparatus of claim 17, wherein the content display apparatus further comprises a user interface module allowing a user to input a request for the content stored in the storage device, and the device agent module generates the message in response to the request.

* * * * *